US006766019B1

(12) United States Patent
Benesty et al.

(10) Patent No.: US 6,766,019 B1
(45) Date of Patent: Jul. 20, 2004

(54) METHOD AND APPARATUS FOR PERFORMING DOUBLE-TALK DETECTION IN ACOUSTIC ECHO CANCELLATION

(75) Inventors: Jacob Benesty, Summit, NJ (US); Tomas Fritz Gaensler, Chatham, NJ (US)

(73) Assignee: Agere Systems Inc., Allentown, PA (US)

( * ) Notice: Subject to any disclaimer, the term of this patent is extended or adjusted under 35 U.S.C. 154(b) by 602 days.

(21) Appl. No.: 09/621,103

(22) Filed: Jul. 21, 2000

(51) Int. Cl.$^7$ .............................................. H04M 9/08

(52) U.S. Cl. ........................... 379/406.01; 379/406.02; 379/406.05; 379/406.08; 379/406.13; 379/417

(58) Field of Search ....................... 379/406.01, 406.09, 379/406.08; 370/201, 287, 290, 286

(56) References Cited

U.S. PATENT DOCUMENTS

| | | | | |
|---|---|---|---|---|
| 5,828,756 A | | 10/1998 | Benesty et al. ............... | 381/66 |
| 6,049,606 A | * | 4/2000 | Ding et al. ............ | 379/406.08 |
| 6,125,179 A | * | 9/2000 | Wu ....................... | 379/388.01 |
| 6,249,581 B1 | * | 6/2001 | Kok ...................... | 379/406.16 |
| 6,434,110 B1 | * | 8/2002 | Hemkumar ................. | 370/201 |
| 6,570,986 B1 | * | 5/2003 | Wu et al. .............. | 379/406.09 |
| 6,597,787 B1 | * | 7/2003 | Lindgren et al. ...... | 379/406.05 |
| 6,687,372 B1 | * | 2/2004 | Trump et al. .......... | 379/406.01 |

OTHER PUBLICATIONS

U.S. patent application Ser. No. 09/228,772, Benesty et al., filed Jan. 6, 1999.
U.S. patent application Ser. No. 09/227,327, Benesty et al., filed Jan. 6, 1999.
U.S. patent application Ser. No. 09/395,834, Benesty et al., filed Sep. 14, 1999.
U.S. patent application Ser. No. 09/473,547, Benesty et al., Dec. 28, 1999.
M.M. Sondhi, "An Adaptive Echo Canceller" The Bell System Technical Journal, vol. 46, No. 3, Mar. 1967.
D,L. Duttweiler, "A Twelve–Channel Digital Echo Canceler" IEEE Transactions on Communications, vol. Com–26, No. 5, May, 1978.
T. Gänsler, S. Gay, M. M. Sondhi, and J. Benesty, "Double-Talk Robust Fast Converging Algorithms For Network Echo Cancellation", Proc. 1999 IEEE Workshop on Applications of Signal Processing to Audio and Acoustics, New Paltz, New York, pp. 215–218, Oct. 17–20, 1999.

(List continued on next page.)

*Primary Examiner*—Binh Tieu
*Assistant Examiner*—Tuan Pham
(74) *Attorney, Agent, or Firm*—Kenneth M. Brown; Richard J. Botos

(57) ABSTRACT

A method and apparatus for performing double-talk detection in an acoustic echo canceller in which a detection statistic is advantageously computed based on an estimate of a cross-correlation between the far-end signal and the return signal which has been normalized with use of an estimate of a covariance matrix of the far-end signal. The estimate of the cross-correlation between the far-end signal and the return signal may be further normalized with use of either an estimate of a variance of the return signal or an estimate of a covariance matrix of the return signal. In certain illustrative embodiments of the invention, one or more of these quantities may be estimated based on signal samples sampled over a predetermined time window. And in another illustrative embodiment of the present invention, the coefficients of the adaptive filter employed in the acoustic echo canceller itself are advantageously used to compute the detection statistic. These computations may be performed in either the time domain or the frequency domain. The detection statistic so computed is compared with a predetermined threshold, which threshold may be advantageously fixed at a value close to one, in order to determine whether or not double-talk has occurred.

8 Claims, 1 Drawing Sheet

OTHER PUBLICATIONS

S. A. Kassam and V. Poor, "Robust Techniques For Signal Processing A Surevey," Proc. IEEE, vol. 73, No. 3, pp. 433–481, Mar. 1965.

H. Ye and B.–X. Wu, "A New Double–Talk Detection Algorithm Baswed on The Orthogonality Theorem.", IEEE Trans. Commun. vol. 39, pp 1542–1545, Nov. 1991.

T. Gänsler, M. Hansson, C.–J.. Ivarsson and G. Salmonsson, "A Double–Talk Detector Based On Coherence." IEEE Trans. Commun. vol. 44, pp. 1421–1427, Nov. 1996.

C.H. Knapp and G. C. Carter, "The Generalized Correlation Method For Estimation of Time Delay," IEEE Trans. Acoust., Speech, Signal Processing, vol. 24, pp. 320–2327, Aug. 1976.

T. Gänsler, J. Benesty, S. Gay, and M. M. Sondhi, "A Robust Proportionate Affine Projection Algorithm For Network Echo Cancellation", Proc. ICASSP vol. II, pp. 793–796, Jun. 2000.

* cited by examiner

METHOD AND APPARATUS FOR PERFORMING DOUBLE-TALK DETECTION IN ACOUSTIC ECHO CANCELLATION

FIELD OF THE INVENTION

The present invention relates generally to the field of acoustic echo cancellation and more particularly to an improved method for detecting double-talk in acoustic echo cancellation systems.

BACKGROUND OF THE INVENTION

With the increasingly commonplace use of speakerphones and teleconferencing, acoustic echo cancellation has recently become a topic of critical importance. In particular, an acoustic echo canceller (AEC) ideally removes the undesired echo signal that invariably feeds back from the loudspeaker to the microphone which are used in full-duplex hands-free telecommunications systems. In particular, echo cancellation is performed by modeling the echo path impulse response with an adaptive finite impulse response (FIR) filter, fully familiar to those of ordinary skill in the art, and subtracting the computed echo estimate from the microphone output signal (i.e., the return signal). FIG. 1 shows a diagram of an illustrative single-channel AEC. (In many cases, stereo echo cancellers are used, but in the context of the instant problem and the present invention, the use of a single-channel teleconferencing system will be adequate for purposes of understanding the invention.) The contents and operation of FIG. 1 will be described in detail below.

More specifically, an acoustic echo canceller mitigates the echo effect by adjusting the transfer function (i.e., the impulse response characteristic) of the adaptive filter in order to generate an estimate of the unwanted return signal. That is, the filter is adapted to mimic the effective transfer function of the acoustic path from the loudspeaker to the microphone. As such, by filtering the incoming signal (i.e., the signal coming from the far-end—shown as x(n) in FIG. 1), the output of the filter will estimate the unwanted return signal which comprises the echo (shown as y(n) in FIG. 1). Then, this estimate is subtracted from the outgoing signal (i.e., the return signal) to produce an error signal (shown as e(n) in FIG. 1). By adapting the filter impulse response characteristic such that the error signal approaches zero, the echo is advantageously reduced or eliminated. That is, the filter coefficients, and hence the estimate of the unwanted echo, are updated in response to continuously received samples of the error signal for more closely effectuating as complete a cancellation of the echo as possible.

Additionally, double-talk detectors (DTD) are generally used in echo cancellers in order to disable the filter adaptation during double-talk conditions. That is, when both the near end party and the far end party to a conversation taking place across a telecommunications line speak simultaneously, it would be clearly undesirable to attempt to minimize the entire "error signal," since that signal now also includes the "double-talk" (i.e., the speech of the near-end speaker, shown as v(n) in FIG. 1). More specifically, the function of a double-talk detector is to recognize that double-talk is occurring, and to stop the filter from further adaptation until the double-talk situation ceases.

The basic double-talk detection scheme typically comprises the computation of a "detection statistic" and the comparison of that statistic with a predetermined threshold. Various prior art methods have been employed to form the detection statistic, each typically using the far-end speech signal, x(n), and the return signal, y(n), as the basis for computing the statistic. (Some approaches use the error signal, e(n) rather than the return signal y(n), which provides essentially the same information.) Obviously, if there were no echo (i.e., the signal from the loudspeaker to the microphone remained totally undisturbed, or equivalently, the effective transfer function, h(n), of the receiving room were unity), and if furthermore there were no background noise, w(n), ill the receiving room, then signals x(n) and y(n) would be identical if and only if there were no double-talk (i.e., x(n)=y(n) it and only if v(n)=0). Since this is not the case, however, the computation of a useful detection statistic must take the presence of the echo, as well as the possible presence of background noise, into account.

More specifically, the generalized procedure for handling double-talk may be described by the following four steps:

1. A detection statistic $\xi$, is formed using the available signals (e.g., x(n), y(n), e(n), etc., and the estimated filter coefficients h);
2. The detection statistics, is compared to a predetermined threshold, T, and double-talk is declared if for example, $\xi < T$;
3. Once double-talk is detected, it is declared to exist for a minimum period of time, $T_{hold}$, during which the filter adaptation is disabled; and
4. If, for example, $\xi \geq T$ continuously for the interval $T_{hold}$, the filter then resumes adaptation, the comparison of $\xi$ to T continues, and double-talk is declared to exist again when, for example, $\xi < T$.

Note that the use of a hold time $T_{hold}$ in steps 3 and 4 above is advantageously employed in order to suppress detection dropouts due to the potentially noisy behavior of the detection statistic. Although there are some possible variations, most DTD algorithms have this basic form and differ only in their specific formation of the detection statistic (and the corresponding choice of the threshold, T).

One particular prior art approach to the formation of the detection statistic, fully familiar to those skilled in the art, is due to A. A. Geigel. (See, e.g., D. L. Dutweiler, "A Twelve-Channel Digital Echo Canceller," IEEE Trans. Commun., vol. 26, no. 5, pp. 647–653, May 1978.) Although the Geigel technique has proven successful when used in network echo cancellers, it has often provided less than reliable performance when used in an acoustic echo cancellation application. Specifically, the Geigel DTD declares presence of near-end speech whenever $$\xi^{(g)} = \frac{\max\{|x(n)|, \ldots, |x(n - L_g + 1)|\}}{|y(n)|} < T, \qquad (1)$$

where $L_g$ and T (the threshold), are suitably chosen constants. This detection scheme is based on a waveform level comparison between the return signal y(n) and the far-end speech x(n), assuming that the near-end speech v(n) at the microphone signal will be typically at the same level, or stronger, than the echo y'(n). The maximum of the $L_g$ most recent samples of x(n) is taken for the comparison because of the unknown delay in the echo path. The predetermined threshold T compensates for the gain of the echo path response h, and is often set to 2 for network echo cancellers because the hybrid (the echo path) loss is typically about 6 dB or more. For an AEC, however, it is not easy to set a universal threshold to work reliably in all the various situations because the loss through the acoustic echo path can vary greatly depending on many factors. For $L_g$, one easy choice is to set it the same as the adaptive filter length L since we can assume that the echo path is covered by this length.

Another prior art technique is to form the detection statistic based on the cross-correlation coefficient vector between the signals x(n) and e(n). (See, e.g., H. Ye et a(., "A New Double-Talk Detection Algorithm Based on the Orthogonality Theorem," IEEE Trans. Commun., vol. 39, pp. 1542–1545, November 1991. ) In fact, using the cross-correlation coefficient vector between x(n) and y(n), rather than between x(n) and e(n), has actually proven more robust and reliable. Specifically, the cross-correlation coefficient vector between x(n) and y(n) is defined as:

$$c_{xy}^{(1)} = \frac{E\{x(n)y(n)\}}{\sqrt{E\{x^2(n)\}E\{y^2(n)\}}} \quad (2)$$
$$= \frac{r_{xy}}{\sigma_x \sigma_y}$$
$$= \begin{bmatrix} c_{xy,0}^{(1)} & c_{xy,1}^{(1)} & \cdots & c_{xy,L-1}^{(1)} \end{bmatrix}^T$$

where $E\{\cdot\}$ denotes mathematical expectation and $c_{xy,i}^{(1)}$ is the cross-correlation coefficient between x(n−i) and y(n).

Specifically, the idea here is to compare $$\xi^{(1)} = \|c_{xy}^{(1)}\|_\infty \quad (3)$$
$$= \max_i |c_{xy,i}^{(1)}|, \quad i = 0, 1, \cdots, L-1$$

to a threshold level, T. The decision rule is simply as follows: if $\xi^{(1)} \geq T$, then double-talk is not present; if $\xi^{(1)} < T$, then double-talk is present.

Although the $l_\infty$ norm is perhaps the most natural, other scalar metrics, such as, for example, $l_1$ or $l_2$, could alternatively be used to assess the cross-correlation coefficient vectors. However, there is a fundamental problem with this approach which is not linked to the type of metric used. The problem is that these cross-correlation coefficient vectors are not well normalized. Indeed, we can only say in general that $\xi^{(1)} \leq 1$. Thus if v(n)=0, that does not imply that $\xi^{(1)}=1$ or any other known value. We do not know the value of $\xi^{(1)}$ in general. The amount of correlation will depend a great deal on the statistics of the signals and of the echo path. As a result, the best value of T will vary a great deal from one situation to another. Thus, there is no "natural" threshold level which can be associated with the variable $\xi^{(1)}$ when v(n)=0.

For these reasons, it would be desirable to provide a double-talk detection scheme which employs a detection statistic and method which overcomes the above limitations of prior art techniques. In particular, note that the decision variable $\xi$ used in double-talk detection should advantageously behave as follows:

1. If v(n)=0 (double-talk is not present), $\xi \geq T$;
2. If v(n)≠0 (double-talk is present), $\xi < T$; and
3. $\xi$ is insensitive to variations in the echo path.

Also note that the threshold T should advantageously be a constant, independent of the data. Moreover, it is desirable that the decisions are made without introducing delay (or at least minimizing the introduced delay) in the updating of the model filter, since delayed decisions will adversely affect the performance of the AEC.

SUMMARY OF THE INVENTION

In accordance with the principles of the present invention, it has been realized that double-talk detection may be advantageously performed based on a cross-correlation between the far-end signal—illustratively, signal x(n) in FIG. 1 and the return signal—illustratively, signal y(n) of FIG. 1—which is, in particular, normalized with use of a covariance (i.e., autocorrelation) matrix of the far-end signal. More particularly, in accordance with the present invention, a detection statistic is advantageously computed based on an estimate of a cross-correlation between the far-end signal and the return signal normalized by a covariance matrix of the far-end signal. In accordance with certain illustrative embodiments of the present invention, the estimate of the cross-correlation between the far-end signal and the return signal may be further normalized with use of either an estimate of a variance of the return signal or an estimate of a covariance matrix of the return signal. In some illustrative embodiments of the invention, one or more of these quantities may be advantageously estimated based on signal samples sampled over a predetermined time window. And in other illustrative embodiments of the present invention, the coefficients of the adaptive filter employed in the acoustic echo canceller itself may be advantageously employed to compute the detection statistic.

In comparison with prior art techniques, performing double-talk detection by estimating such a cross-correlation of the far-end signal and the return signal which has been normalized with use of a covariance matrix of the far-end signal in accordance with certain embodiments of the present invention achieves a more proper normalization in that the resultant detection statistic will be equal to one when the near-end signal (i.e., the double-talk) is zero. Thus, a double-talk detection procedure formulated in accordance with the principles of the present invention (i.e., using a detection statistic $\xi$ computed in accordance with these principles) can be advantageously designed to behave according to the beneficial properties listed above—that is, given a properly chosen threshold T, which may advantageously be a constant, independent of the data, it can be ensured that:

1. If v(n)=0 (double-talk is not present), $\xi \geq T$;
2. If v(n)≠0 (double-talk is present), $\xi < T$; and
3. $\xi$ is insensitive to variations in the echo path.

DETAILED DESCRIPTION

Acoustic Echo Canceller Overview

Figure 1:
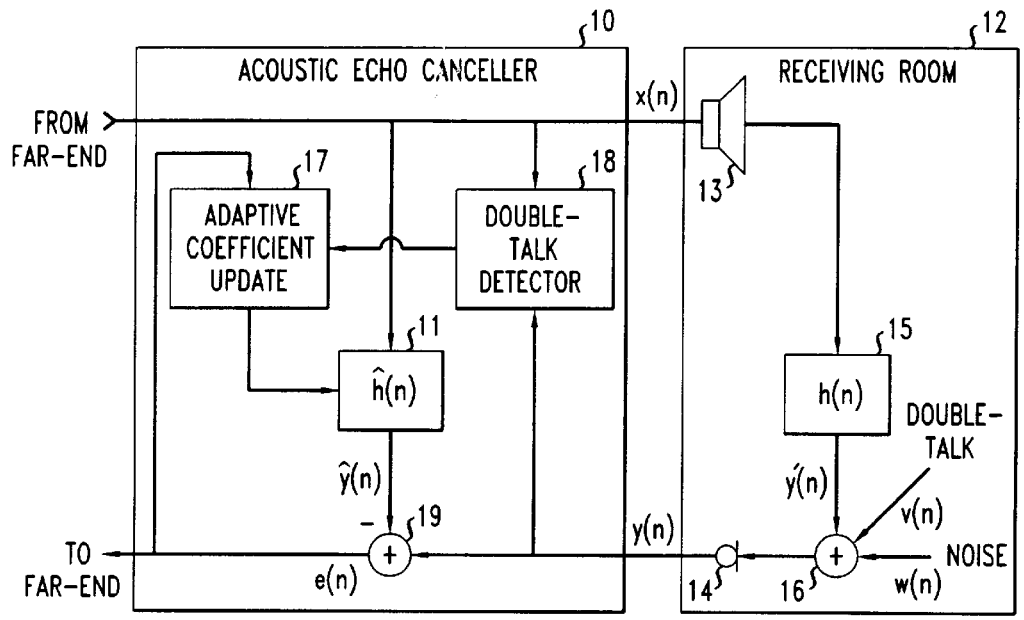
FIG. 1 shows a diagram of a single-channel acoustic echo canceller in which an illustrative embodiment of the present invention may be incorporated.

FIG. 1 shows a block diagram of a single channel acoustic echo canceller in which an illustrative embodiment of the present invention may be incorporated. The environment in which the illustrative echo canceller operates includes (near-end) receiving room 12, which contains a conventional loudspeaker 13 and a conventional microphone 14. Loudspeaker 13 produces an acoustic signal from far-end signal x(n), which comprises speech received from a far-end talker. As a result of the implicit transfer function, h(n), effectuated by the acoustic path(s) through room 12, an echo, y'(n), is produced. Implicit transfer function h(n) is illustratively shown in the figure as filter 15. Note that the transfer function h(n) is likely to change over time, as a result, for example, of movement within the room of either the loudspeaker, the microphone, the occupants, etc. The echo, y'(n), is combined with the room's ambient noise, w(n), and if there is double-talk (i.e., a person in room 12 who is also talking), is also combined with the double-talk, v(n). This implicit combination of signals occurring in room 12 is illustratively shown in the figure as adder 16. The resultant combined signal is then picked up by microphone 14 which generates return signal y(n), which may contain, inter alia, an echo.

Acoustic echo canceller 10 of FIG. 1 comprises (adaptive) filter 11, adaptive coefficient update module 17, double-talk detector 18, and conventional subtractor 19. Filter 11 may be a conventional adaptive finite impulse response (FIR) filter, and may, for example, have a filter length of either 512 or 1024. Double-talk detector (DTD) 18 advantageously employs a novel double-talk detection procedure in accordance with one of the illustrative embodiments of the present invention described herein. And finally, adaptive coefficient update module 17 implements any of a number of possible adaptive algorithms, many of which will be familiar to those of ordinary skill in the art. One such adaptive algorithm which may be advantageously employed, for example, is a Fast Recursive Least Squares (FRLS) adaptive algorithm based on a predetermined probability density function, as described in co-pending U.S. patent application Ser. No. 09/603652, "A Robust Adaptive Filter For Use In Acoustic And Network Echo Cancellation," by J. Benesty et al., filed on Jun. 26, 2000, and commonly assigned to the assignee of the present invention. U.S. patent application Ser. No. 09/603652 is hereby incorporated by reference as if fully set forth herein. As described below, one particular illustrative embodiment of the present invention makes advantageous use of the fact that the FRLS adaptive algorithm has been employed for echo cancellation.

In operation, the illustrative acoustic echo canceller of FIG. 1 filters the far-end signal, x(n), to produce an echo estimate signal, ŷ(n), with use of filter 11, the coefficients of which are advantageously continuously adapted in accordance with the algorithm of adaptive coefficient update module 17. Upon the detection of double-talk by double-talk detector 18 (with use of one of the illustrative embodiments of the present invention), the adaptation of the coefficients is advantageously suspended. The echo estimate signal, ŷ(n), is then subtracted from the return signal y(n) by subtractor 19 to generate the error signal, e(n). The error signal serves both as the primary input to adaptive coefficient update module 17 (which signal adaptive coefficient update module 17 attempts to minimize by its continuous updates of the filter coefficients), and as the signal to be returned to the far-end of the telecommunications system.

Mathematically, the far-end signal x(n) is filtered with the impulse response h(n) and the resulting signal (the echo y'(n)) is added to the near-end speech signal v(n) and the ambient noise signal w(n). Ignoring the ambient noise signal, the return signal therefore becomes $$y(n) = h^T x(n) + v(n) \tag{4}$$

where $$h = [h_0 h_1 \ldots h_{L-1}]^T, \tag{5}$$

$$x(n) = [x(n) x(n-1) \ldots x(n-L+1)]^T, \tag{6}$$

and where L is the length of the echo path. We define the error signal at time n as $$e(n) = y(n) - \hat{h}^T x(n). \tag{7}$$

This error signal is used in the adaptive algorithm to adapt the L taps of the filter ĥ.

For simplicity, we have assumed here that the length of the signal vector x is the same as the effective length of the echo path h. In reality, the length of h is infinite, thereby resulting in an unmodeled "tail" for any finite value of L. This effect will be discussed below.

When v is not present, with any adaptive algorithm, ĥ will quickly converge to an estimate of h and this is the best way to cancel the echo. When x is not present, or very small, adaptation is halted by the nature of the adaptive algorithm. When both x and v are present, the near-end talker signal could disrupt the adaptation of h and cause divergence. So, the goal of an effective double-talk detection algorithm is to stop the adaptation of ĥ as fast as possible when the level of v becomes appreciable in relation to the level of x, and to keep the adaptation going when the level of v is negligible.

Prior Art Cross-correlation Technique

As described above, using the cross-correlation coefficient vector between the far-end signal and the return signal in order to compute a detection statistic for double-talk detection has been advantageously employed in the past, albeit with the above described limitations. More specifically, the cross-correlation vector between x(n) and y(n) is defined as $$c_{xy}^{(1)} = [\, C_{xy,0}^{(1)} \;\; C_{xy,1}^{(1)} \;\; \cdots \;\; C_{xy,L-1}^{(1)} \,]^T \tag{8}$$

where $$C_{xy,i}^{(1)} = \frac{E\{x(k-i)y(k)\}}{\sqrt{E\{x^2(k-i)\}E\{y^2(k)\}}} \tag{9}$$

and where the operator E{·} denotes statistical expectation.

The detection statistic ξ may be formed by taking the inverse norm of the cross-correlation vector. Any scalar metric is possible in taking the norm such as the $l_1$, $l_2$, or $l_{2\infty}$ metric. Using the $l_\infty$ norm, for example, $$\xi_{xy}^{(1)} = \left[ \max_i |\hat{C}_{xy,i}^{(1)}| \right]^{-1} \tag{10}$$

where $\hat{C}_{xy,i}^{(1)}$ are estimates of $C_{xy,i}^{(1)}$. A time average or exponentially windowed sum may be advantageously used for the estimation of these statistical quantities. For example, $$E\{x(k-i)y(k)\} \approx (1 - e^{-1/W}) \sum_{j=0}^{\infty} x(k-i-j) \cdot y(k-j) e^{-j/W} \tag{11}$$

Other statistical expectations are estimated analogously. The effective window length W needs to be long enough for smooth estimation but should advantageously not be too long because of the non-stationary nature of the speech signal and the desirability of rapid response.

An Illustrative Novel Normalized Cross-correlation Vector Approach

In accordance with the principles of the present invention, the following derivation of a new normalized cross-correlation (NCC) vector provides for an advantageous double-talk detection method in accordance with one illustrative embodiment of the present invention. Specifically, we derive in a simple way a new normalized cross-correlation vector between a vector x and a scalar y. Suppose that v=0. In this case $$\sigma_y^2 = h^T R_{xx} h \tag{12}$$

where $R_{xx} = E\{x(n)x^T(n)\}$. Since $y(n) = h^T x(n)$, we have $$r_{xy} = R_{xx} h \tag{13}$$

and therefore we can rewrite the above equation as $$\sigma_y^2 = r_{xy}^T R_{xx}^{-1} r_{xy} + \sigma_v^2. \tag{14}$$

Now, in general, for $v \neq 0$, $$\sigma_y^2 = r_{xy}^T R_{xx}^{-1} r_{xy} + \sigma_v^2. \tag{15}$$

If we divide equation (14) by $\sigma_v^2$ and take the square root, we obtain a new decision variable $$\xi_{xy}^{(2)} = \sqrt{r_{xy}^T (\sigma_y^2 R_{xx})^{-1} r_{xy}} \tag{16}$$
$$= \|c_{xy}^{(2)}\|_2$$

where $$c_{xy}^{(2)} = (\sigma_y^2 R_{xx})^{-1/2} r_{xy} \tag{17}$$

is what we will call the normalized cross-correlation vector between x and y.

Substituting equations (13) and (15) into equation (16), we show that the decision variable is $$\xi^{(2)} = \frac{\sqrt{h^T R_{xx} h}}{\sqrt{h^T R_{xx} h + \sigma_v^2}}. \tag{18}$$

We can easily deduce from equation (18) that for $v=0$, $\xi^{(2)}=1$ and for $v \neq 0$, $\xi^{(2)} < 1$. Note also that $\xi^{(2)}$ is not sensitive to changes of the echo path when $v=0$. Moreover, in accordance with one particular illustrative embodiment of the present inventions a fast version of this algorithm can be derived by recursively updating $R_{xx}^{-1} r_{xy}$ using the Kalman gain $R_{xx}^{-1} x$ (familiar to those skilled in the art), given that the acoustic echo cancellation is being performed with use of a FRLS algorithm (which calculates the Kalman gain for its own purposes). (See, e.g., U.S. patent application Ser. No. 09/603652 which has been incorporated by reference herein.)

Note that in the particular case where x is white Gaussian noise, the autocorrelation matrix is diagonal: $R_{xx} = \sigma_x^2 I$. Then equation (17) becomes $$c_{xy}^{(2)} = \frac{r_{xy}}{\sigma_x \sigma_y} \tag{19}$$
$$= c_{xy}^{(1)}.$$

Note that, in general, what we are doing in equation (16) is equivalent to prewhitening the signal x, which is one of the many known generalized cross-correlation techniques, familiar to those of ordinary skill in the art. (See, e.g., C. H. Knapp et al., "The Generalized Correlation Method for Estimation of Time Delay," IEEE Trans. Acoust., Speech, Signal Processing, vol. 24, pp. 320–327, August 1976.) Thus, when x is white, no prewhitening is necessary and $c_{xy}^{(2)} = c_{xy}^{(1)}$. This suggests one possible illustrative embodiment of the present invention in which matrix operations are advantageously replaced by an adaptive prewhitening filter.

An Illustrative Fast Normalized Cross-correlation Vector Approach

The detection statistic as shown in equation (16) is rather complex to calculate. However, as pointed out above, a fast version of this algorithm can be advantageously derived by recursively updating $R_{xx}^{-1} r_{xy}$ using the Kalman gain $R^{-1} x$ (n), well known to those of ordinary skill in the art, which is advantageously calculated in the FRLS acoustic echo cancellation algorithm. The resulting double-talk detector, referred to herein as the Fast NCC (FNCC), may therefore be advantageously derived as follows.

Specifically, estimated quantities of the cross-correlation and the near-end signal power are advantageously introduced for the derivation of the FNCC DTD algorithm. Note that equation (16) may be written as $$\xi^2(n) = \frac{r^T(n) R^{-1}(n) r(n)}{\sigma_y^2(n)} = \frac{\eta^2(n)}{\sigma_y^2(n)} \tag{20}$$

where we have squared the statistics for simplicity. The correlation variables may be estimated as, $$r(n) = \lambda r(n-1) + x(n) y(n), \tag{21}$$

$$R(n) = \lambda R(n-1) + x(n) x^T(n), \tag{22}$$

$$\sigma_y^2(n) = \lambda \sigma_y^2(n-1) + y^2(n). \tag{23}$$

The following lists some useful relations, each of which will be clear to those skilled in the art, that are frequently used in the following derivation:

$$R^{-1}(n) = \lambda^{-1} R^{-1}(n-1) - \lambda^{-1} \frac{R^{-1}(n-1) x(n) x^T(n) R^{-1}(n-1)}{\alpha(n)} \tag{24}$$

$$k(n) = R^{-1}(n) x(n) = \frac{1}{\alpha(n)} R^{-1}(n-1) x(n), \tag{25}$$

a posteriori Kalman gain $$k'(n) = R^{-1}(n-1) x(n), \text{ a priori Kalman gain} \tag{26}$$

$$x(n) x(n) k(n) = x^T(n) R^{-1}(n-1) x(n) \tag{27}$$

$$\alpha(n) r^T(n-1) k(n) = r^T(n-1) R^{-1}(n-1) x(n) = h_b^T(n-1) x(n) = \hat{y}(n), \text{ estimated echo} \tag{28}$$

Looking further at the statistic $\eta^2(n)$, $$\eta^2(n) = [\lambda r^T(n-1) + y(n) x^T(n)] R^{-1}(n) [\lambda r(n-1) + x(n) y(n)] \tag{29}$$
$$= \lambda^2 r^T(n-1) R^{-1}(n) r(n-1) + \lambda r^T(n-1) R^{-1}(n) x(n) y(n) +$$
$$\lambda y(n) x^T(n) R^{-1}(n) r(n-1) + y^2(n) x^T(n) R^{-1}(n) x(n)$$
$$= \lambda^2 r^T(n-1) [\lambda^{-1} R^{-1}(n-1) - \lambda^{-1} \alpha(n) k(n) k^T(n)] r(n-1) +$$
$$2 \lambda y(n) k^T(n) r(n-1) + y^2(n) x^T(n) k(n)$$
$$= \lambda r^T(n-1) + R^{-1}(n-1) r(n-1) - \lambda \alpha(n) (k^T(n) r(n-1))^2 +$$
$$2 \lambda y(n) k^T(n) r(n-1) + y^2(n) \left(1 - \frac{\lambda}{\alpha(n)}\right)$$
$$= \lambda \eta^2(n-1) - \frac{\lambda}{\alpha(n)} \hat{y}^2(n) + 2 \frac{\lambda}{\alpha(n)} y(n) \hat{y}(n) + \left(1 - \frac{\lambda}{\alpha(n)}\right) y^2(n)$$
$$= \lambda \eta^2(n-1) - \vartheta(n) \hat{y}^2(n) + 2 \vartheta(n) \hat{y}(n) y(n) + [1 - \vartheta(n)] y^2(n)$$
$$= \lambda \eta^2(n-1) + y^2(n) - \vartheta(n) e^2(n)$$

where the likelihood variable $\vartheta(n) = \lambda/\alpha(n)$ and $e(n)$ is the residual error, $e(n) = y(n) - \hat{y}(n)$. We find that the statistics needed to form the test statistic of the FNCC DTD are given by the simple first order recursions in equations (28) and (29). Assuming that the Kalman gain has been calculated by the FRLS algorithm, the following table gives the essential calculations for both the FNCC DTD and echo canceller in accordance with the illustrative embodiment of the present invention. Note that we need to distinguish between the echo path estimate calculated in the DTD (referred to herein as $\hat{h}_b(n)$), and the estimate calculated in the echo canceller, $\hat{h}(n)$.

Double-talk Detector:

$$\sigma_y^2(n) = \lambda \sigma_y^2(n-1) + y^2(n) \tag{30}$$

$$e_b(n) = y(n) - \hat{h}_b^T(n-1)x(n) \tag{31}$$

$$\eta(n) = \lambda \eta^2(n-1) + y^2(n) - \vartheta(n)e_b^2(n) \tag{32}$$

$$\eta(n)/\sigma_y(n) < T, \rightarrow \text{double-talk}, \mu = 0 \tag{33}$$

$$\eta(n)/\sigma_y(n) \geq T, \rightarrow \text{no double-talk}, \mu = 1 \tag{34}$$

$$\hat{h}_b(n) = \hat{h}_b(n-1) + k'(n)\frac{e_b(n)}{\varphi(n)} \tag{35}$$

Robust Echo Cancellation:

$$e(n) = y(n) - \hat{h}^T(n-1)x(n) \tag{36}$$

$$\hat{h}(n) = \hat{h}(n-1) + \mu \frac{s(n)}{\psi'\left[\frac{e(n)}{s(n)}\right]\varphi(n)} k'(n)\psi'\frac{e(n)}{s(n)} \tag{37}$$

$$s(n-1) = \lambda_s s(n) + (1-\lambda_s)\frac{s(n)}{\psi'\left[\frac{e(n)}{s(n)}\right]}\left|\psi\left[\frac{e(n)}{s(n)}\right]\right| \tag{38}$$

An Illustrative Procedure for Detecting Double-talk

Figure 2:
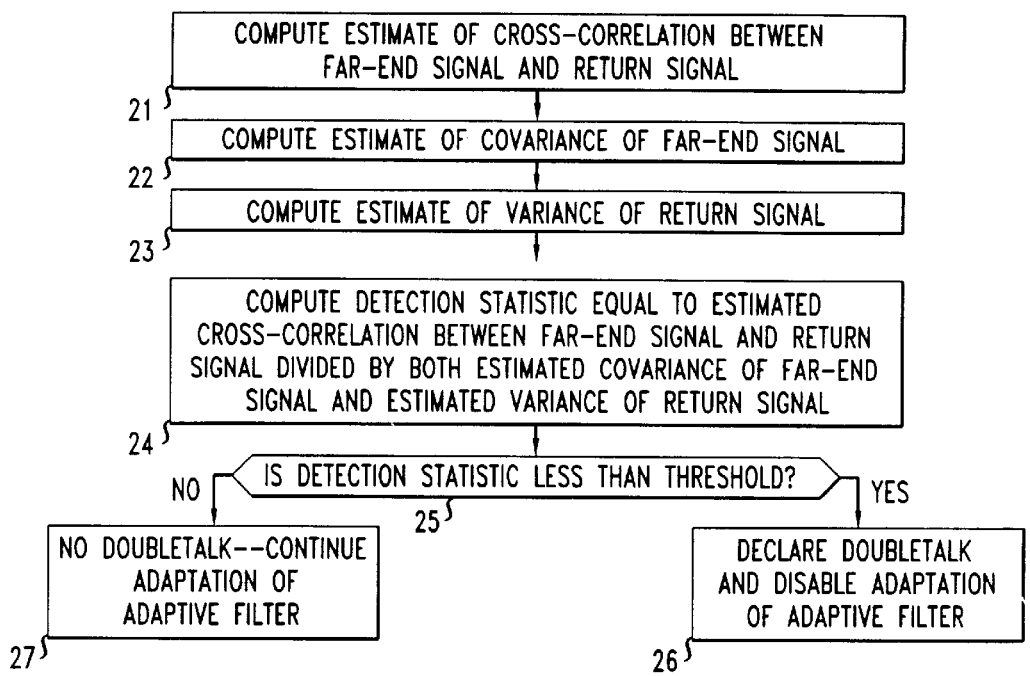
FIG. 2 shows a flowchart detailing one possible implementation of a double-talk detection procedure in accordance with an illustrative embodiment of the present invention.

FIG. 2 shows a flowchart detailing one possible implementation of a double-talk detection procedure in accordance with an illustrative embodiment of the present invention. Specifically, flowchart block 21 computes an estimate of tile cross-correlation between the far-end signal and the return signal; flowchart block 22 computes an estimate of the covariance of the far-end signal; and flowchart block 23 computes an estimate of the variance of the return signal. Then, flowchart block 24 computes the detection statistic by normalizing the estimated cross-correlation between the far-end signal and the return signal by both the estimate of the covariance of the far-end signal and the estimate of the variance of the return signal. Finally, flowchart decision box 25 compares the computed detection statistic to a predetermined threshold, T, which, advantageously, is a constant slightly less than one (e.g., $0.85 \leq T \leq 0.99$). If the detection statistic is less than the threshold (flowchart box 26), then double-talk is declared and the adaptation of the corresponding acoustic echo canceller's adaptive filter is advantageously disabled until the double-talk condition ceases. Otherwise (flowchart block 27), adaptation of the adaptive filter continues.

An Illustrative Novel Normalized Cross-correlation Matrix Approach

Given the above-described approach which derives an illustrative detection statistic based on a new normalized cross-correlation vector between a vector x and a scalar y, we now describe an extension of this approach to a new normalized cross-correlation between two vectors x and y. We define the normalized cross-correlation matrix $C_{xy}$ between two vectors x and y as follows:

$$C_{xy} = R_{xx}^{-1/2} R_{xy} R_{yy}^{-1/2} \tag{39}$$

where $$y(n) = [y(n)y(n-1) \ldots y(n-N+1)]^T \tag{40}$$

is a vector of size N. There are two particularly interesting cases:

1) $N=1$, $C_{xy} = c_{xy}^{(2)}$ (normalized cross-correlation vector between x and y).

2) $N=L=1$, $C_{xy} = c_{xy,0}^{(1)}$ (cross-correlation coefficient between x and y).

By extension to equation (16), we then form the detection statistic $$\xi^{(3)} = \frac{1}{\sqrt{N}}\|C_{xy}\|_E = \frac{1}{\sqrt{N}}\sqrt{tr(C_{xy}^T C_{xy})}. \tag{41}$$

We note that for case 1) above, $\xi^{(3)} = \xi^{(2)}$ as before. Again, we can interpret this formulation as a generalized cross-correlation, where now both x and y are prewhitened, which is also known to those skilled in the art as the "smoothed coherence transform" (SCOT). (See, e.g., C. H. Knapp et al., referenced above.)

We now show that there is a link between the normalized cross-correlation matrix and the coherence. Suppose that $N=L\rightarrow\infty$. In this case, a Toeplitz matrix (familiar to those skilled in the art) is asymptotically equivalent to a circulant matrix (also familiar to those skilled in the art) if its elements are absolutely summable, which is the case for the intended application herein. Hence we can advantageously decompose $R_{ab}$ as $$R_{ab} = F^{-1}S_{ab}F \tag{42}$$

where F is the discrete Fourier transform (DFT) matrix and $$S_{ab} = \text{diag}\{S_{ab}(0), S_{ab}(1), \ldots, S_{ab}(L-1)\} \tag{43}$$

is a diagonal matrix formed by the first column of $FR_{ab}$, and $$S_{ab}(k) = \sum_{m=-\infty}^{+\infty} E\{a(n)b(n-m)\}e^{-i2\pi km/L} \tag{44}$$

$$= \sum_{m=|\infty}^{+\infty} R_{ab}(m)e^{i2\pi km/L}.$$

is the DFT cross-power spectrum. Now $$tr(C_{xy}^T C_{xy}) = tr(R_{xy}^{-1/2} R_{yx} R_{xx}^{-1} R_{xy} R_{yy}^{-1/2}) \tag{45}$$

$$= tr(R_{yx} R_{xx}^{-1} R_{xy} R_{yy}^{-1})$$

since $tr(AB) = tr(BA)$. Using equation (42), we easily find that $$tr(C_{xy}^T C_{xy}) = tr(S_{yx}S_{xx}^{-1}S_{xy}S_{yy}^{-1}) \quad (46)$$
$$= \sum_{k=0}^{L-1} |\gamma_{xy}(k)|^2$$

where $$\gamma_{xy}(k) = \frac{S_{xy}(k)}{\sqrt{S_{xx}(k)S_{yy}(k)}} \quad (47)$$

is the discrete coherence function. Thus, asymptotically we have $$\xi^{(3)} \approx \sqrt{\frac{1}{L}\sum_{k=0}^{L-1} |\gamma_{xy}(k)|^2} \quad (48)$$

$$= \sqrt{\frac{1}{L}\sum_{k=0}^{L-1} \frac{|H(k)|^2}{|H(k)|^2 + \kappa(k)}}$$

where H(k) is the transfer function of h and $$\kappa(k) = \frac{S_{vv}(k)}{S_{xx}(k)} \geq 0 \quad (49)$$

is the near-end talker to far-end talker spectral ratio at frequency k. Except for an unrestricted frequency range, this form is similar to the coherence-based double-talk detector proposed by Gänsler in T. Gänsler et al., "A Double-Talk Detector Based on Coherence," IEEE Trans. Commun., vol. 44, pp. 1421–1427, November 1996. (Because all frequencies are not equally important, it is generally advantageous to limit the frequency range in equation (48), or, more generally, apply weighting over frequency.) This idea seems to be very appropriate since when v=0, the two signals x and y are completely coherent and then $|\gamma_{xy}(k)|=1. \forall k$, and $\xi^{(3)} \approx 1$; when $v \neq 0. |\gamma_{xy}(k)| < 1, \forall k$, and $\xi^{(3)} < 1$.

Additional Considerations

Up until now, we have formulated the double-talk decision variables in terms of the various auto-correlation and cross-correlation signal statistics, taking those as a given. However, in practice, it will be desirable to estimate these quantities in real time from the only available signals to which we have ready access, namely x(n) and y(n). Estimation of auto-correlation and cross-correlation signal statistics may be achieved by averaging over a suitable time interval, which becomes a concern because of the inevitable tradeoff between response time and accuracy. Response time is important for double-talk detection, so we would like to minimize it. On the other hand, if we try to make the response time too fast, insufficient smoothing of the statistical estimates may lead to less than reliable performance.

As is familiar to those of ordinary skill in the art, the usual procedure to derive estimates of statistical quantities like $r_{xy}$ and $R_{xx}$ is to form a running average of the signal products over a window that moves with time. The length of the window, that is, the number of samples that form the running average, then determines the response time of the estimate, which is advantageously not allowed to become too long. Thus, for example, we have $$\hat{r}_{xy}(n) = \sum_{m=0}^{M-1} x(n-m)y(n-m) \quad (50)$$

which averages over M samples.

Note that it is possible to avoid the estimation of certain quantities involved in the decision variables by substituting estimates that have been derived for other purposes. For example, from equation (13) we know that $R_{xx}^{-1}r_{xy}=h$. Therefore, in equation (16), we could substitute $\hat{h}$ for $R_{xx}^{-1}r_{xy}$, where $\hat{h}$ is copied from the echo canceller adaptive filter. This will perturb the ideal performance of the normalized cross-correlation DTD even when the filter is converged, due to the unmodeled "tail" of h, as pointed out above. However, the computational advantage of avoiding matrix inversion (or the calculation of the Kalman gain as suggested above) makes the substitution attractive for a practical implementation. Thus, in accordance with one illustrative embodiment of the present invention, adapted coefficients from the adaptive filter used by the acoustic echo canceller may be advantageously employed in the calculation of the detection statistic.

An Illustrative Normalized Cross-correlation Approach in the Frequency Domain

In copending U.S. patent application Ser. No. 09/473547, "Multi-Channel Frequency-Domain Adaptive Filter Method And Apparatus" by J. Benesty et al., filed on Dec. 28, 1999 and commonly assigned to the assignee of the present invention, a multi-channel acoustic echo canceller was described in which the adaptive algorithm was performed in the frequency domain (rather than in the time domain). U.S. patent application Ser. No. 09/473547 is hereby incorporated by reference as if fully set forth herein. The following discussion derives and presents a frequency domain version of the above-described NCC DTD technique which, in accordance with one illustrative embodiment of the present invention, may be advantageously used in combination with a frequency domain adaptive algorithm such as that described in U.S. patent application Ser. No. 09/473547.

Specifically, calculation of the detection statistic $\xi^{(2)}$ of equation (16) in the frequency-domain can be made from what may be referred to as the "normalized pseudo coherence" (NPC) vector, namely, $$c_{xy}^{pc} = (2L^2\sigma_y^2 S)^{-\frac{1}{2}}s, \quad (51)$$

where $$S = E\{D^H(m)G\ D(m)\}, \quad (52)$$

and $$s = E\{D^H(m)y(m)\} \quad (53)$$

Looking in particular at equation (51), we see that each cross-spectrum bin of equation (53) is normalized by the corresponding spectrum in the input signal, (x). What differentiates equation (51) from being the true coherence is that it is not normalized by the corresponding spectrum of the output signal (y) but by the whole power of the output signal, $\sigma_y^2$—hence we refer to it as "pseudo coherence." A detection statistic can then be advantageously defined in the frequency-domain using (51), as follows:

$$\xi^{pc} = \|c_{xy}^{pc}\|_2. \quad (54)$$

A useful double-talk detection statistic can now be advantageously realized by using estimated quantities in equation (54) and slightly rewriting the numerator from equation (51), as follows:

$$\xi^2(m) == \frac{s^H(m)\hat{h}_b(m)}{\sigma_y^2(m)} = \frac{\eta^2(m)}{\sigma_y^2(m)}, \quad (55)$$

where the statistics have been squared and the superscript has been dropped for simplicity. Note that the echo path estimate, $\hat{h}_b(m)$, called the background filer (subscript$_b$) Should not be confused with the foreground estimate computed by the adaptive filter. Moreover, this estimate may be advantageously adapted with a smaller forgetting factor, $\lambda_b$, than that of the foreground filter, $\lambda_f$. Thus, we ensure that the DTD detects double-talk quickly and alerts the foreground filter before it diverges. The variables of equation (55) may be estimated as $$s(m)=\lambda_b s(m-1)+(1-\lambda_b)D^H(m)y(m), \quad (56)$$

$$\hat{h}(m)=\hat{h}_b(m-1)+(1-\lambda_b)S_u^{-1}(m)D^H(m)e_b(m), \quad (57)$$

and $$\sigma_y^2(m)=\lambda_b\sigma_y^2(m-1)+(1-\lambda_b)y^H(m)y(m), \quad (58)$$

where $$e_b(m)=y(m)-GD(m)\hat{h}_b(m-1). \quad (59)$$

Finally, it can be shown that equations (16) and (54) are equivalent by looking at the inner product of the cross-spectrum vector in equation (53) and the frequency-domain echo path vector. We also know that $y(m)-GD(m)\hat{h}$ in the noise-less case and $G=G^H G$.

$$\hat{h}^H s = \hat{h}^H E\{D^H(m)G^H GD(m)\}\hat{h} \quad (60)$$

$$= 2L\hat{h}^H F^{-H}E\{C^H(m)WC(m)\}F^{-1}\hat{h}$$

$$= 2L^2\hat{h}^T R\hat{h}$$

$$= 2L^2 r^T R^{-1} r$$

where $$C(m)=[C_1(m)C_2(m)\ldots C_1,(m)]. \quad (61)$$

A similar type of calculation shows that $$E\{\sigma_y^2\} = E\{y^H(m)y(m)\} = 2L^2\sigma_y^2.$$

Multi-channel Acoustic Echo Cancellation Embodiments of the Present Invention Although the preceding discussions have been limited to describing illustrative embodiments of the present invention for use in single channel echo cancellation applications, extensions to multi-channel applications are straightforward and will be obvious to those skilled in the art based on the disclosure herein. See, e.g., co-pending U.S. patent application Ser. No. 09/473547, cited and incorporated by reference above, for illustrative details regarding multi-channel acoustic echo cancellation.

Addendum to the Detailed Description

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, (a) a combination of circuit elements which performs that function or (b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent (within the meaning of that term as used in 35 U.S.C. 112, paragraph 6) to those explicitly shown and described herein.

What is claimed is:

1. A method of double-talk detection for use in an acoustic echo canceller, the acoustic echo canceller for reducing unwanted echo generated in a receiving room which receives a far-end signal comprising incoming speech and which produces a return signal having said unwanted echo included therein, the method comprising:

computing a normalized cross-correlation estimate representative of a cross-correlation between said far-end signal and said return signal normalized by a covariance of said far-end signal and further normalized by a variance of said return signal;

computing a detection statistic based upon said normalized cross-correlation estimate using the formula:

$$\xi = \sqrt{r_{xy}^T(\sigma_y^2 R_{xx})^{...}}$$

wherein $\sigma_y^2$ represents the variance of the return signal, $R_{xx}$ represents the covariance of the far-end signal, and $r_{xy}$ represents the cross-correlation between the far-end signal and the return signal; and detecting that double-talk has occurred in said receiving room based on a comparison of said detection-statistic to a predetermined threshold.

2. The method of claim 1 wherein said detection statistic is computed by estimating one or more of (a) said covariance of said far-end signal, (b) said cross-correlation between the far-end signal and the return signal, and (c) said variance of the return signal, based on signal samples thereof, sampled over a predetermined time window.

3. A double-talk detection apparatus for use in an acoustic echo canceller, the acoustic echo canceller for reducing unwanted echo generated in a receiving room which receives a far-end signal comprising incoming speech and which produces a return signal having said unwanted echo included therein, the apparatus comprising:

means for computing a normalized cross-correlation estimate representative of a cross-correlation between said far-end signal and said return signal normalized by a covariance of said far-end signal and further normalized by a variance of said return signal;

means for computing a detection statistic based upon said normalized cross-correlation estimate using the formula:

$$\xi = \sqrt{r_{xy}^T(\sigma_y^2 R_{xx})^{...}}$$

wherein $\sigma_y^2$ represents the variance of the return signal, $R_{xx}$ represents the covariance of the far-end signal, and $r_{xy}$ represents the cross-correlation between the far-end signal and the return signal; and means for detecting that double-talk has occurred in said receiving room based on a comparison of said detection statistic to a predetermined threshold.

4. The apparatus of claim 3 wherein the detection statistic is computed by estimating one or more of (a) said covariance of said far-end signal, (b) said cross-correlation between the far-end signal and the return signal, and (c) said variance of the return signal, based on signal samples thereof, sampled over a predetermined time window.

5. A method of double-talk detection for use in an acoustic echo canceller, the acoustic echo canceller for reducing unwanted echo generated in a receiving room which receives a far-end signal comprising incoming speech and which produces a return signal having said unwanted echo included therein, the method comprising:

computing a normalized cross-correlation estimate representative of a cross-correlation between said far-end signal and said return signal normalized by a covariance of said far-end signal and further normalized by a covariance of said return signal;

computing a detection statistic based upon said normalized cross-correlation estimate using the formula:

$$\xi = \frac{1}{\sqrt{N}} \|C_{xy}\|_E = \frac{1}{\sqrt{N}} \sqrt{tr(C_{xy}^T C_{xy})}$$

wherein $C_{xy} = R_{xx}^{-1/2} R_{xy} R_{yy}^{-1/2}$, and wherein $R_{xx}$ represents the covariance of the far-end signal, $R_{xy}$ represents the cross-correlation between the far-end signal and the return signal, and $R_{yy}$ represents the covariance of the return signal; and detecting that double-talk has occurred in said receiving room based on a comparison of said detection statistic to a predetermined threshold.

6. The method of claim 5, wherein said detection statistic is computed by estimating one or more of (a) said covariance of said far-end signal, (b) said covariance of said return signal, and (c) said cross-correlation between said far-end signal and said return signal, based on signal samples thereof, sampled over a predetermined time window.

7. A double-talk detection apparatus for use in an acoustic echo canceller, the acoustic echo canceller for reducing unwanted echo generated in a receiving room which receives a far-end signal comprising incoming speech and which produces a return signal having said unwanted echo included therein, the apparatus comprising:

means for computing a normalized cross-correlation estimate representative of a cross-correlation between said far-end signal and said return signal normalized by a covariance of said far-end signal and further normalized by a covariance of said return signal;

means for computing a detection statistic based upon said normalized cross-correlation estimate using the formula:

$$\xi = \frac{1}{\sqrt{N}} \|C_{xy}\|_E = \frac{1}{\sqrt{N}} \sqrt{tr(C_{xy}^T C_{xy})}$$

wherein $C_{xy} = R_{xx}^{-1/2} R_{xy} R_{yy}^{-1/2}$, and wherein $R_{xx}$ represents the covariance of the far-end signal, $R_{xy}$ represents the cross-correlation between the far-end signal and the return signal, and $R_{yy}$ represents the covariance of the return signal ; and means for detecting that double-talk has occurred in said receiving room based on a comparison of said detection statistic to a predetermined threshold.

8. The apparatus of claim 7 wherein the detection statistic is computed by estimating one or more of (a) said covariance of said far-end signal, (b) said covariance of said return signal, and (c) said cross-correlation between said far-end signal and said return signal, based on signal samples thereof, sampled over a predetermined time window.

* * * * *